Sept. 6, 1955  C. A. PIPER  2,717,370
TRANSMITTING SYSTEM AND METHOD
Filed Sept. 8, 1950  2 Sheets-Sheet 1
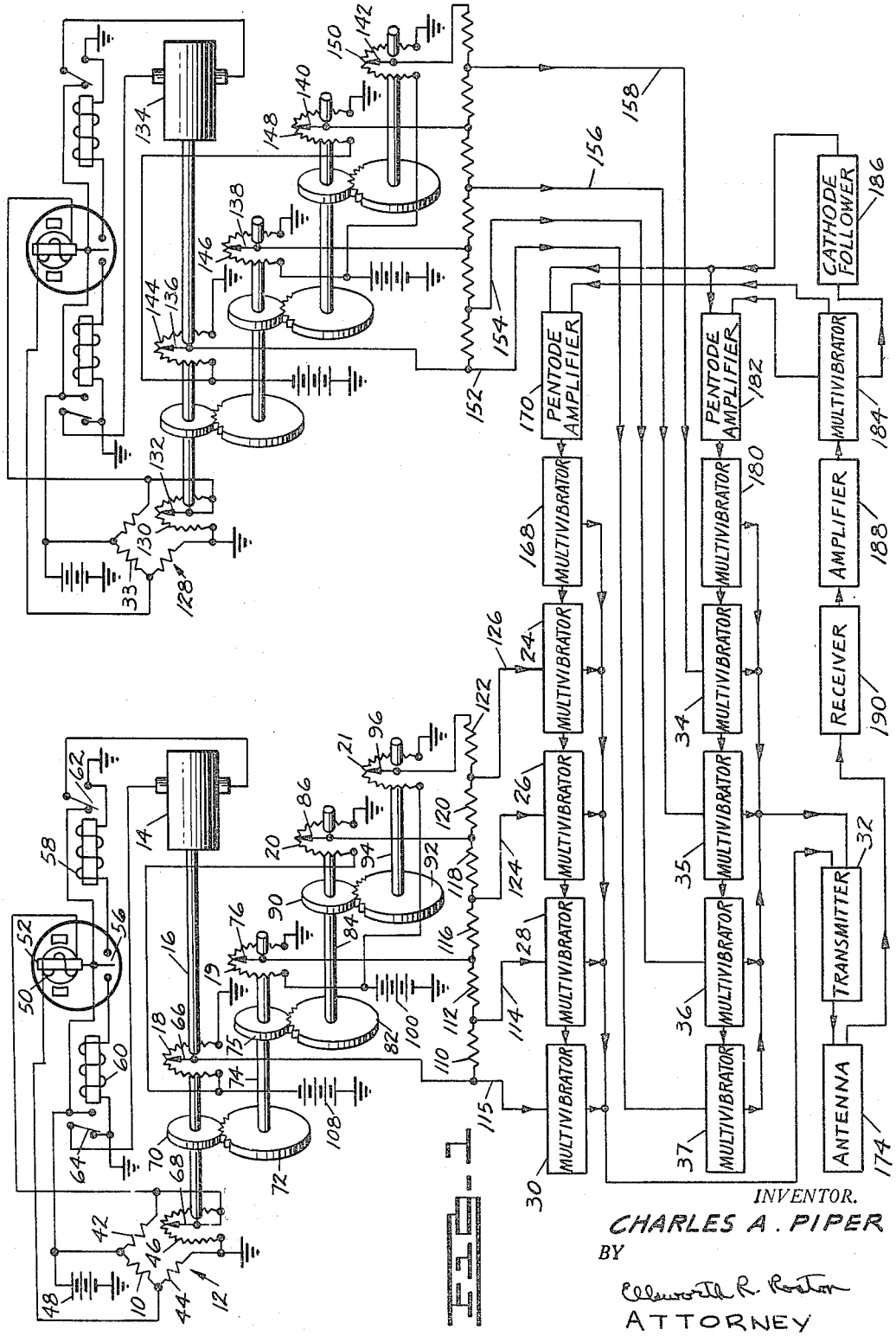
INVENTOR.
CHARLES A. PIPER
BY
Ellsworth R. Roston
ATTORNEY

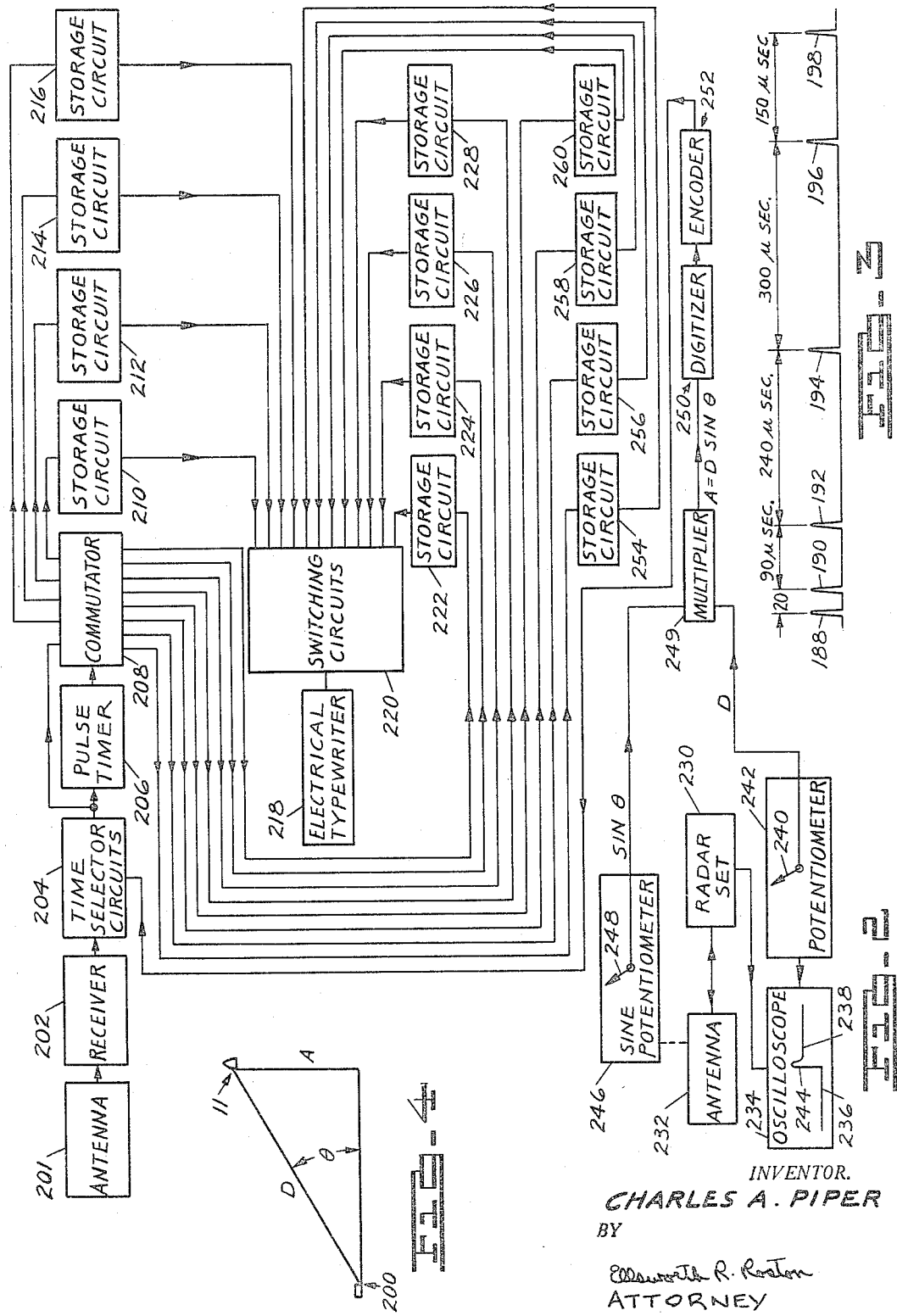

United States Patent Office 2,717,370
Patented Sept. 6, 1955

2,717,370

TRANSMITTING SYSTEM AND METHOD

Charles A. Piper, Detroit, Mich., assignor to Bendix Aviation Corporation, Detroit, Mich., a corporation of Delaware Application September 8, 1950, Serial No. 183,717

13 Claims. (Cl. 340—151)

This invention relates to apparatus for, and methods of, measuring a variable condition and transmitting the information obtained. More particularly, the invention relates to apparatus for, and methods of, providing numerical information as to the variable condition in a form adapted to be easily and efficiently transmitted to a distant station for recordation and analysis. The invention is especially adapted to be used where only relatively small errors can be tolerated.

As a result of the great advances which have been made in meteorological knowledge during the past few years, it is now believed that measurements of air temperature and pressure at altitudes up to 100,000 feet may be of considerable value in predicting future weather conditions. For example, changes in temperature and/or pressure at different altitudes, although slight, may influence cloud formation, wind direction and wind velocity.

Apparatus now exists for accurately and instantaneously measuring air temperature and pressure so that slight changes in these conditions can be detected. When used in meteorological applications, the measuring apparatus is carried by suitable motive equipment, such as a rocket, to an altitude of 100,000 feet. When the rocket starts to fall, the measuring apparatus is detached and, at the same time, a parachute is opened so that the apparatus will descend slowly to the ground. Measurements of temperature, pressure and altitude are made during the descent.

Before the measurements can be of any value, they must be recorded, correlated and analyzed. Recording apparatus could be provided in the rocket with the measuring apparatus but this would make the air-borne equipment too heavy and bulky. Furthermore, analysis of the measurements would be delayed until the apparatus could be located after it floated to the ground, often producing long delays which would render worthless the information obtained. Because of this, it appears desirable to transmit the information obtained by the measuring apparatus to a ground station for recordation and analysis. Since slight changes in temperature or pressure at different altitudes may affect subsequent weather conditions, the information obtained must be transmitted, received and recorded with minimum error, so that the accuracy in measurement will not be affected.

Heretofore, it has been found difficult to convert accurate measurements into a form which can be transmitted without any material increase in error. This invention provides apparatus for, and methods of, separating such numerical determinations into separate digits and providing voltages proportional to each digit. The invention also provides apparatus for, and methods of, converting each voltage into a pulse which is separated from a subsequent pulse by a time interval proportional to the voltage. The pulses are transmitted in sequence to the ground station, where they act upon appropriate electrical circuits to reproduce the original number.

An object of this invention is to provide apparatus for measuring conditions such as temperature and pressure with great accuracy.

Another object is to provide apparatus for accurately measuring the altitude at which the temperature and pressure measurements are being made.

A further object is to provide apparatus for expressing a variable condition as a multi-digital number, separating the number into separate digits and determining the value of each digit.

Still another object is to provide apparatus for producing voltages proportional to the value of each digit in a multi-digital number.

A still further object is to provide apparatus for transmitting numerical information in such a coded form that their accuracy will be maintained, when the information is decoded at the point of reception.

Another object is to provide apparatus for converting into a sequence of suitably spaced pulses a plurality of voltages which are proportional to the values of different digits in a multi-digital number.

Another object is to provide apparatus for coordinating the measurement and transmission of temperature, pressure and altitudes so that the ground station receiving such information can classify the type of information being received at any instant.

A further object is to provide apparatus of the above indicated character which is simple, compact, efficient and reliable.

Still another object is to provide methods of accurately measuring such conditions as temperature, pressure and altitude and transmitting the information obtained to a ground station without any loss in accuracy.

Other objects and advantages of the invention will be apparent from a detailed description of the invention and from the appended drawings and claims.

In the drawings:

Figure 1 is a schematic diagram, partly in block form, of the air-borne apparatus;

Figure 2 is a block diagram of the apparatus at the ground station;

Figure 3 illustrates the time relationship of the various information signals transmitted by the air-borne apparatus; and Figure 4 illustrates how the altitude of the air-borne apparatus is determined from the position of the air-borne apparatus relative to the ground apparatus.

In one embodiment of the invention, a resistance 10 is provided in an air-borne apparatus, generally indicated at 11 (Figure 4), to indicate changes in temperature by proportionate changes in its value. A balance for the resistance 10 is provided by a Wheatstone bridge, generally indicated at 12, which is operated by a servomotor 14 through a shaft 16. The rotation of the shaft is proportional to the temperature measurement and produces on potentiometers 18, 19, 20 and 21 voltages which are proportional to the value of a particular digit of the temperature measurement. The voltages on the potentiometers 18, 19, 20 and 21 are converted in sequence by multivibrators 24, 26, 28 and 30 into pulses separated by time intervals corresponding to the voltages. These pulses are used to modulate the carrier signals from a transmitter 32.

In a similar manner, changes in air pressure produce changes in the value of a resistance 33, and the resultant value of the resistance 33, when broken down into digits, determines the periods of time between the various modulation pulses produced by multivibrators 34, 35, 36 and 37. The pulses representing the pressure measurements alternate with the pulses representing the temperature measurements in modulating the carrier signals from the transmitter 32.

The pulse-modulated signals from the air-borne apparatus are transmitted to a ground station, where they are demodulated, decoded and recorded. Information as to the altitude at which the pressure and temperature measurement are made is also obtained at the ground station and correlated with the pressure and temperature information.

Specifically, the Wheatstone bridge includes resistances 42 and 44 and a potentiometer 46 in addition to the resistance 10. The resistances 42 and 44 and the potentiometer 46 are sealed in a heat-insulated chamber, but the resistance 10 is exposed to the atmosphere and is adapted to respond quickly and accurately to changes in air temperature. A suitable power supply, such as a battery 48 is connected to the common terminal between the resistances 10 and 42, and the common terminal between the resistance 44 and the potentiometer 46 is grounded. A winding 50 having an armature 52 is connected to the common terminal between the resistances 10 and 44 and to the common terminal between the resistance 42 and the potentiometer 46, respectively.

The movable contact of a double-throw switch 56 is suspended from the armature 52, and the stationary contacts of the switch are connected to grounded solenoids 58 and 60. The solenoids 58 and 60 act upon the movable contacts of double-throw switches 62 and 64, respectively, the movable contacts of the switches being connected to the servomotor 14. Each of the switches 62 and 64 has one stationary contact connected to the positive terminal of the battery 48 and the other terminal connected to ground.

The rotatable arm 66 of the potentiometer 18 is mounted on the shaft 16, which drives the movable arm 68 of the potentiometer 46. The shaft also drives a gear 70 which meshes with, and has a 1:10 tooth ratio to, a gear 72. The gear 72 is in turn mounted on a shaft 74 which carries a gear 75 and the rotatable arm 76 of the potentiometer 19. The gear 75 has a 1:10 tooth ratio with a gear 82 which is mounted on a shaft 84, the shaft carrying the rotatable arm 86 of the potentiometer 20 as well as a gear 90 having a 1:10 tooth ratio with a gear 92. A shaft 94 carries the gear 92 and the tap 96 of the potentiometer 21.

The potentiometers 19 and 21 are each connected between the positive and negative terminals of a suitable power supply, such as a battery 100, the negative terminal of which is grounded. The potentiometers 18 and 20 are connected to a battery 108, which has its positive terminal grounded. The batteries 100 and 108 are adapted to provide voltages of equal magnitude but opposite polarity to their respective potentiometers.

A pair of voltage-dividing resistances 110 and 112 having a 1:10 ratio with each other are provided in series with the potentiometer arms 66 and 76. An output lead 114 extends from the common terminal between the resistances 110 and 112, and an output lead 115 extends from the arm 66. In like manner, voltage-dividing networks comprising resistances 116 and 118 and resistances 120 and 122 are provided in series with the potentiometer arms 76 and 86 and with the arms 86 and 96, respectively. Output leads 124 and 126 extend from the common terminal between the resistances 116 and 118 and the common terminal between the resistances 120 and 122, respectively. The resistances 110, 112, 116, 118, 120 and 122 have considerably larger values than the potentiometers 18, 19, 20 and 21.

Just as the resistance 10 is located in a Wheatstone bridge 12 to indicate changes in air temperature, the resistance 33 is located in a Wheatstone bridge, generally indicated at 128, to indicate changes in air pressure. The Wheatstone bridge includes a potentiometer 130 having a rotatable arm 132 which is driven by a servomotor 134. Operation of the servomotor 134 to balance the Wheatstane bridge 128 produces rotation of a gear train which is similar to the gear train disclosed above. Rotation is also produced in the rotatable arms 136, 138, 140 and 142 of the potentiometers 144, 146, 148 and 150, respectively, which correspond to the potentiometers 18, 19, 20 and 21, respectively. Output leads 152, 154, 156 and 158 extend from voltage-adding networks similar to those disclosed above.

The output leads 115, 114, 124, and 126 from the temperature measuring apparatus are connected to the multivibrators 30, 28, 26 and 24, respectively. These multivibrators are connected to a multivibrator 168 and a pentode amplifier 170 in a cascade arrangement and their output sides are connected to the transmitter 32, which is in turn connected to an antenna 174. In like manner, the output leads 152, 154, 156 and 158 from the pressure measuring apparatus are connected to the multivibrators 37, 36, 35 and 34, respectively, which are in turn connected in a cascade arrangement to a multivibrator 180 and pentode amplifier 182. The output sides of the multivibrators 34, 35, 36, 37 and 180 are connected to the transmitter 32. Phanastrons or other appropriate circuits may be used instead of the multivibrators disclosed above.

The pentode amplifiers 170 and 182 have signals introduced to them from a bi-stable multivibrator 184 and a cathode follower 186. The multivibrator 184 and cathode follower 186 are operated by signals from an amplifier 188, the input side of which is connected to a receiver 190. The input side of the receiver is connected to the antenna 174.

The above apparatus is housed within the head of a rocket which is capable of reaching an altitude of 100,000 feet after being launched. At the maximum altitude, the head is detached and a parachute is opened so that the apparatus in the head will descend at a relatively slow rate to the ground. As the rocket head falls, the temperature of the air varies, producing corresponding variations in the value of the resistance 10. The resultant unbalance in the Wheatstone bridge 12 causes current to flow through the winding 50, and the switch 56 closes. With increases in the resistance 12 resulting from an increase in temperature, the movable contact of the switch 56 engages the right stationary contact and provides a continuous circuit through the solenoid 58. Similarly, a continuous circuit is established through the solenoid 60 when the temperature falls.

When the solenoid 58 is energized, the movable contact of the switch 62 moves to the left stationary contact shown in Figure 1 and establishes a continuous circuit through the servo motor 14. This circuit includes the battery 48, the left stationary contact and the movable contact of the switch 62, the servomotor 14 and the movable and left stationary contacts of the switch 64. The servomotor operates until the Wheatstone bridge 12 becomes balanced, at which time the switch 56 opens and the switch 62 returns to its original position. With decreases in the value of the resistance 10, the servomotor rotates the shaft 16 in an opposite direction until the Wheatstone bridge is balanced.

The shafts 74, 84 and 94 rotate through angles which are respectively, 10, 100 and 1,000 times less than the angular rotation of the shaft 16. This causes the voltages on the potentiometer arms 66, 76, 86 and 96 to be particularly responsive to the value of one digit of the temperature measurement. Thus, the voltage on the arm 96 is proportional to the numerical value of the temperature measurement itself. For example, with a temperature measurement of 279.4° K., the arm 96 has a voltage of 2.794 volts. The voltage on the arm 86 is proportional to a number formed by removing the first digit from the temperature measurement and has an opposite polarity to the voltage on the arm 96. With 279.4° K. as the temperature, the voltage on the arm 86 is −7.94 volts. The voltage on the arm 86 is decimally divided by the resistances 120 and 122 and combined with the voltage on the arm 96 to produce a voltage proportional to the value of the first digit of the temperature measurement. In the above example, the output lead 126 has a voltage of +2.794−0.794=2 volts.

The voltage on the arm 76 is proportional to a number formed by removing the first two digits of the temperature measurement. When this number is decimally divided by the resistances 116 and 118 and combined with the voltage on the arm 86, the lead 124 is provided with a negative output voltage which has a value proportional to the value of the second digit. The voltage on the lead 124 may be made positive by passing it through an inverter stage, or the voltage may be utilized directly, since only the magnitude of the output voltage is important. In the example above, the voltage on the arm 76 is +9.4 volts. When decimally divided and combined with the voltage on the arm 86, a voltage of −7.94+0.94=−7 volts is produced. In like manner, +9 volts and −4 volts are produced on the output leads 114 and 115, respectively, in the example above.

The apparatus responsive to air pressure produces positive voltages on the output leads 158 and 154 which are proportional to the value of the first and third digits in the pressure measurement and negative voltages on the output leads 156 and 152 which are proportional to the value of the second and fourth digits.

Although a particular system has been disclosed for measuring temperature and pressure and for digitizing the measurements obtained, other systems may also be used, either for measuring temperature and/or pressure or for measuring other conditions, such as humidity. For example, other embodiments of the digitizing system have been disclosed in co-pending application No. 166,462, filed June 6, 1950, by Charles A. Piper et al., now Patent No. 2,631,778. Furthermore, the above apparatus may be extended to provide output voltages proportional to more than four digits.

The temperature and pressure measurements are alternately transmitted to the ground station for recordation and analysis. This occurs upon the reception by the receiver 190 of interrogation pulses from the ground station. After being amplified by the amplifier 188, the interrogation pulses are applied to the multivibrator 184, which has two tubes connected in a flip-flop arrangement. The first pulse causes one of the tubes to conduct, the second pulse causes the other tube to conduct, the third pulse causes the first tube to conduct, etc. The signals resulting from the conduction of the first multivibrator tube are applied to one grid of the pentode amplifier 170 and the signals resulting from the conduction of the second multivibrator tube are applied to a corresponding grid of the pentode amplifier 182. These signals are mixed with the interrogation pulses themselves, which are introduced to another grid of the pentode amplifiers 170 and 182 from the cathode follower 186. Since each pentode amplifier conducts only when signals are simultaneously applied to its two grids from the multivibrator 184 and the cathode follower 186, the pentode amplifier 170 conducts when odd interrogation pulses are received and the pentode amplifier 182 conducts upon the reception of even interrogation pulses.

When the amplifier 170 conducts, it produces an initial acknowledging signal which is transmitted to prepare the ground station for subsequent information. This acknowledging signal is illustrated by pulse 188 in Figure 3 and is introduced to the multivibrator 168, which is of the "flip-flop" or bi-stable type. One tube of the multivibrator conducts for a predetermined period of time, such as 20 microseconds, and then the multivibrator "flops," causing the other tube to conduct. A pulse signal, illustrated at 190 in Figure 3, is transmitted when the second tube conducts. Because of the predetermined time interval between the pulses from the pentode amplifier 170 and the multivibrator 168, the multivibrator pulse serves as an identification signal to indicate to the ground station that the signals which follow are to be interpreted as temperature information.

The trailing edge of the identification pulse from the multivibrator 168 triggers the multivibrator 24 and causes one of the multivibrator tubes to conduct for a period of time determined by the voltage on the output lead 126. The multivibrator tube is biased so that it will conduct for a time interval proportional to the value of an integer when the voltage on the output lead 126 is zero. This initial interval corresponds to the value "0." The tube continues to conduct for a number of similar intervals determined by the voltage on the output lead 126 and then the other tube in the multivibrator starts to conduct, producing a signal for transmission. The period of time between this transmitted signal and the identification pulse 190 is proportional to the value of the first digit in the temperature measurement. For example, if a time interval of 30 microseconds represents one interger, the period of time between the identification pulse and the first information pulse would be 90 microseconds for a temperature measurement of 279.4° K. For a temperature measurement of 279.4° K., the first information pulse is illustrated at 192 in Figure 3.

The first tube of the multivibrator 26 is triggered by the trailing edge of the signal produced by the second tube of the multivibrator 24. The tube conducts for a period of time proportional to the voltage on the output lead 124 and then triggers the second tube. The signal produced by the conduction of the second tube is transmitted to the ground station as the second information pulse. The period of time between this pulse and the first information pulse is proportional to the second digit of the temperature measurement. In the example above, the period of time between the first and second pulses would be 240 microseconds, as shown at 194 in Figure 3.

The multivibrator 28 is triggered by the trailing edge of the information pulse from the multivibrator 26 and the multivibrator 30 is similarly triggered by the trailing edge of the information pulse from the multivibrator 28. When the temperature is 279.4° K., a transmission pulse 196 from the multivibrator 28 follows the pulse 194 by 300 microseconds, as shown in Figure 3, and a pulse 198 from the multivibrator 30 follows the pulse 196 by 150 microseconds.

After the temperature information has been transmitted to the ground station, the multivibrator 184 operates to trigger the pentode amplifier 182 when the next interrogation pulse is received from the ground station. Conduction of the pentode amplifier 182 causes the multivibrators 180, 34, 35, 36 and 37 to operate in sequence for the transmission of pressure information to the ground station. The sequential operation of the multivibrators is similar to that disclosed above.

A ground station, generally indicated at 200 in Figure 4, decodes the information which it receives from the airborne apparatus and records this information for subsequent analysis. The information is received by an antenna 201 and is passed through a receiver 202 into time selector circuits 204. The circuits 204 operate on the basis of the separation between the acknowledging and identification pulses to indicate whether the information pulses relate to temperature or pressure. The signals are then introduced into a pulse timer 206 which produces a signal every 30 microseconds during the period between adjacent pulses to provide a numerical indication of each digit. The signals are only produced during internal intervals of 30 microseconds and are not produced at the beginning or end of the period between adjacent pulses. Thus, two signals are formed by the circuit 206 during the 90 microsecond period between the identification pulse and the first information pulse when the temperature is 279.4° K., and seven signals are formed during the 240 microsecond interval between the first and second information pulses.

The signals from the time selector circuits 204 and the pulse timer 206 are introduced into a commutator 208, which directs the pressure and temperature information into separate channels in accordance with the information supplied by the time selector 204. Storage circuits 210, 212, 214, and 216 are associated with the commutator 208 to count the signals supplied at 30 microsecond intervals by the pulse timer 206 and to hold the numerical information concerning each digit until the information can be typewritten by an electrically operated typewriter 218. Switching circuits 220 are provided between the storage circuits and the typewriter 218 to operate the typewriter in sequence in accordance with the signals stored in each of the storage circuits 210, 212, 214 and 216. Similarly, storage circuits 222, 224, 226 and 228 are provided in a cascade arrangement to hold information as to each digit in the pressure measurement until the information can be typewritten.

Before the temperature and pressure measurements can be analyzed by the ground station 200, the altitude at which such measurements are made must be determined. As indicated in Figure 4, the altitude of the air-borne apparatus may be determined by the formula:

$$A = D \sin \theta$$

where $A$ = altitude of the air-borne apparatus, $D$ = the distance between the ground station 200 and the air-borne apparatus 11, and $\theta$ = angle which the line between the ground station and the air-borne apparatus forms with the earth.

To indicate the distance D, a radar set 230 is provided in the ground station. The radar set has a directional antenna 232 which is operated to point constantly at the air-borne apparatus. The radar set transmits pulse modulated signals which are reflected back to the antenna 232 by the air-borne apparatus. The reflected signals are introduced to an oscilloscope 234 which is provided with a reference line 236 having a pedestal 238 superimposed over part of its length. An adjustable arm 240 of a potentiometer 242 is manually operated so that the leading edge of the reflected pulse appears at the leading edge of the pedestal 238, as indicated at 244. The potentiometer 242 is calibrated so that the adjustable arm 240 indicates the distance D between the ground station and the air-borne apparatus.

Sin $\theta$ is determined by a sine potentiometer 246 having an adjustable arm 248 which is ganged to the antenna 232 to follow its directional movement. Sin $\theta$ is indicated by the angle through which the arm 248 turns in following the movement of the antenna 232.

If the voltages on the arms 240 and 248 are combined in a multiplier stage 249, a resultant voltage will be produced which will be proportional to the altitude of the air-borne apparatus. This voltage is introduced to a digitizer, generally indicated at 250, which is similar to the digitizers shown in Figure 1. The voltages from the digitizer 250 are then introduced to an encoder, generally indicated at 252, and from the encoder into the time selector circuits 204. The signals produced by the time selector circuits 204 and the pulse timer 206 are channelized by the commutator 208 into storage circuits 254, 256, 258 and 260, which sequentially energize the switching circuits 220 for operating the typewriter 218.

Instead of determining the altitude of the air-borne apparatus 11 by transmitting signals from the ground station 200, the altitude can be determined by measuring the period of time between the transmission of an interrogation pulse from the ground station and the reception at the ground station of the pulse 188 in the sequence following the interrogation pulse. This period of time between the interrogation pulse and the pulse 188 provides an indication of range. The range information can be converted at the ground station into an altitude indication in a manner similar to that disclosed above and shown in Figures 2 and 4. After the transmission of the pulse 188 providing an indication of range as well as an acknowledgment of the interrogation pulse, the air-borne transmitting equipment may sequentially transmit digital information on such atmospheric conditions as pressure and temperature, as disclosed above and shown in Figures 1 and 3.

There is thus provided apparatus for accurately measuring temperature and pressure at different altitudes and for converting these measurements into a form which can be efficiently and reliably transmitted to a ground station for recordation and analysis. Measurements of the altitude at which the temperature and pressure information is being obtained may be made at the ground station or may be determined from signals transmitted from the air-borne object. The altitude information is correlated with the pressure and temperature information at the ground station.

Although this invention has been disclosed and illustrated with reference to particular applications, the principles involved are susceptible of numerous other applications which will be apparent to persons skilled in the art. The invention is, therefore to be limited only as indicated by the scope of the appended claims.

What is claimed is:

1. In combination, means for determining the values of a plurality of conditions, means for expressing each determination by a plurality of digital values and for providing voltages proportional to the value of each digit in a determination, means operative by a first interrogation pulse to produce a pair of coded pulses separated by a predetermined period of time to provide an indication that the pulses which follow represent a first condition, means for producing a sequence of pulses spaced from one another and from the second of the two coded pulses by time intervals proportional to voltages representing a digital determination of the first condition, means operative by a second interrogation pulse after the end of the first pulse sequence to produce a second pair of coded pulses separated by a predetermined period of time to provide an indication that the pulses which follow represent a second condition, means for producing a sequence of pulses spaced from one another and spaced from the second pulse in the second coded pair by time intervals proportional to the voltages representing a determination of the second condition, means for transmitting the different pulse sequences, and means operative at a removed station to decode the pulse sequences and provide a record of the variable conditions.

2. In combination, means for determining the values of a plurality of conditions, means for expressing each determination by a plurality of digital values and for providing voltages proportional to the value of each digit in a determination, a plurality of channels, each adapted to provide a coded indication of a different condition, means for receiving interrogation pulses from a central station, means for sequentially activating the different channels upon the reception of successive interrogating pulses from the central station, means operative upon the activation of each channel to produce an initial pair of pulses separated by a predetermined period of time to provide a coded indication that the pulses which follow represent the condition associated with the channel, means associated with each channel and operative by the voltage means to produce after the coded pair of pulses a plurality of pulses separated by periods of time providing an indication of the values of the different digits representing a measurement of the condition associated with the channel means, means for transmitting the sequences of pulses representing the different conditions, and means for receiving the sequences of pulses and for decoding the pulses in each sequence to provide an indication of the different conditions.

3. In combination, means for determining the values of a plurality of conditions, means for expressing each determination by a plurality of digital values and for providing voltages proportional to the value of each digit in a determination, a plurality of channel means each operative to produce a first pair of pulses providing a coded indication that the pulses which follow represent a different condition, means for receiving interrogation pulses from a distant station, means operative by successive interrogation pulses to activate the different channel means in sequence, means associated with each channel means and operative by the voltage means to produce after the coded pair of pulses a plurality of pulses separated by periods of time providing an indication of the values of the different digits representing a measurement of the condition associated with the channel means, means for transmitting the sequences of pulses representing the different conditions, and means for receiving the sequences of pulses and for decoding the pulses in each sequence to provide an indication of the different conditions.

4. In combination, means for determining the values of a plurality of conditions, means for expressing each determination by a plurality of digital values and for providing voltages proportional to the value of each digit in a determination, means at a central station for producing interrogation pulses at a predetermined frequency, means operative upon the reception of each interrogation pulse to direct each pulse into a separate channel for the activation of the channel, means for introducing into each channel the voltages providing a digital indication of a different condition, means operative upon the activation of a channel to produce a pair of pulses separated by a predetermined period of time to provide a coded indication of the condition whose voltages are introduced to the channel, means operative upon the formation of the second coded pulse in a channel to produce a plurality of pulses separated from one another and from the second coded pulse by periods of time proportional to the voltages introduced to the channel, means for transmitting each coded sequence of pulses, and means operative at the central station to decode the pulse sequences and provide a record of the different conditions.

5. In combination, means for determining the values of a pluarlity of variable conditions, means for converting each determination into voltages proportional to the different digits in the determination, means for transmitting carrier signals, means for receiving interrogation pulses from a central station, means operative upon the reception of a first interrogation pulse to trigger the transmitting means at intervals proportional to the digital voltages comprising a first determination, and means operative after the transmission of the first set of signals and upon the reception of a second interrogation pulse to trigger the transmitting means at intervals proportional to the digital voltages comprising a second determination.

6. In combination, means for determining the values of a plurality of variable conditions, means for expressing each determination by a plurality of digital values and providing voltages proportional to the value of each digit in a determination, means operative by an interrogation pulse from a removed station to produce a sequence of pulses spaced from one another by time intervals proportional to the voltages in a determination, means operative upon the reception of another interrogation pulse after the end of one pulse sequence to produce a second sequence of pulses spaced from one another by time intervals proportional to the voltages in another determination, means for transmitting the pulse sequences, and means operative at the removed station to decode the pulse sequences and provide a record of the variable conditions.

7. In combination, means for determining the values of a plurality of conditions, means for expressing each determination by a plurality of digital values and for providing voltages proportional to the value of each digit in a determination, means at a central station for producing interrogation pulses at a predetermined frequency, means operative upon the reception of each interrogation pulse to direct each pulse into a separate channel for the activation of the channel, a plurality of multivibrators included in each channel, means for individually introducing into the multivibrators in each channel the voltages providing a digital indication of a different condition, means, including a multivibrator, operative upon the activation of a channel to produce a pair of pulses separated by a predetermined period of time to provide a coded indication of the condition whose voltages are introduced to the channel, means, including the first mentioned multivibrators, operative upon the formation of the second coded pulse in a channel to produce a pluraltiy of pulses separated from one another and from the second coded pulse by periods of time proportional to the voltages introduced to the channel, means for transmitting each coded sequence of pulses, and means operative at the central station to decode the pulse sequences and provide a record of the different conditions.

8. In combination, means for determining the values of a plurality of variable conditions, a digitizer for converting each determination into voltages proportional to the different digits in the determination, a transmitter for sending out carrier signals, a receiver for receiving interrogation pulses from a central station, a first plurality of bistable members operative upon the reception of a first interrogation pulse to trigger the transmitter at intervals corresponding to the digital voltages comprising a first determination, and a second plurality of bistable members operative after the transmission of the first set of signals and upon the reception of a second interrogation pulse to trigger the transmitting means at intervals corresponding to the digital voltages comprising a second determination.

9. In combination, means for determining the values of a plurality of conditions, digitizing means for expressing each determination by a plurality of digital values and for providing voltages corresponding to the value of each digit in a determination, means at a central station for producing interrogation pulses at a predetermined frequency, a first plurality of bistable members separated into groups, the bistable members in each group being sequentally operative to produce a plurality of pulses spaced by periods of time corresponding to the voltages indicative of a different condition in the plutraliy, a bistable member operative upon the reception of each interrogation pulse to trigger a different group of bistable members into operation for the production of a pulse sequence, a transmitter for sending out the pulse sequences, and means operative at the central station to decode the pulse sequences and provide a record of the different conditions.

10. In combination, means for determining the values of a plurality of conditions, digitizing means for expressing each determination by a plurality of digital values and for providing voltages corresponding to the value of each digit in a determination, means at a central station for producing interrogation pulses at a predetermined frequency, a first plurality of bistable members separated into groups, the bistable members in each group being sequentially operative to produce a plurality of pulses spaced by periods of time corresponding to the voltages indicative of a different condition in the plurality, a second plurality of bistable members, each bistable member in the second plurality being associated with a different group of bistable members in the first plurality, each bistable member in the second plurality being operative upon the reception of successive interrogation pulses to produce an initial pair of pulses providing an indication that the pulses produced by its associated group represent a predetermined condition, and a transmitter for sending out the pulse sequences.

11. In combination, means for determining the values of a plurality of conditions, digitizing means for expressing each determination by a plurality of digital values and for providing voltages corresponding to the value of each digit in a determination, means at a central station for producing interrogation pulses at a predetermined frequency, a first plurality of bistable members separated into groups, the bistable members in each group being sequentially operative to produce a plurality of pulses spaced by periods of time corresponding to the voltages indicative of a different condition in the purality, a second plurality of bistable members, each bistable member in the second plurality being associated with a different group of bistable members in the first plurality to produce an initial pair of pulses providing an indication that the pulses produced by its associated group represent a predetermined condition, a bistable member operative upon the reception of each interrogation pulse to trigger a different bistable member in the second plurality and its associated group in the first plurality into operation for the production of a pulse sequence, and a transmitter for sending out the pulse sequences.

12. In combination, means for determining the values of a plurality of conditions, a digitizer for expressing each determination by a plurality of digital values and for providing voltages corresponding to the value of each digit in a determination, means for producing interrogation pulses at a central station, a first bistable member operative upon the reception of a first interrogation pulse to produce a pair of coded pulses separated by a predetermined period of time to provide an indication that the pulses which follow represent a first condition, a first plurality of bistable members for producing a sequence of pulses spaced from one another and from the second of the two coded pulses by time intervals corresponding to voltages representing a digital determination of the first condition, a second bistable member operative by a second interrogation pulse after the end of the first pulse sequence to produce a second pair of coded pulses separated by a predetermined period of time to provide an indication that the pulses which follow represent a second condition, a second plurality of bistable members for producing a sequence of pulses spaced from one another and from the second pulse in the second coded pair by time intervals corresponding to the voltages representing a determination of the second condition, a transmitter for sending out the different pulse sequences, and means operative at the central station to decode the pulse sequences.

13. In combination, means for determining the values of a plurality of conditions, a digitizer for expressing each determination by a plurality of digital values and for providing voltages corresponding to the value of each digit in a determination, means for producing interrogation pulses at a central station, a first bistable member operative upon the reception of successive interrogation pulses to become alternately triggered into one state of operation and then into a second state of operation, a second bistable member operative upon the triggering of the first bistable member into its first state of operation to produce a pair of coded pulses separated by a predetermined period of time to provide an indication that the pulses which follow represent a first condition, a first plurality of bistable members operative upon the production of the pair of coded pulses by the second bistable member to produce a sequence of pulses spaced from one another and from the second of the two coded pulses by time intervals corresponding to voltages representing a digital determination of the first condition, a third bistable member operative upon the triggering of the first bistable member into its second state of operation to produce a pair of coded pulses separated by a predetermined period of time to provide an indication that the pulses which follow represent a second condition, a second plurality of bistable members operative upon the production of the pair of coded pulses by the third bistable member to produce a sequence of pulses spaced from one another and from the second of the two coded pulses by time intervals corresponding to voltages representing a digital determination of the second condition, a transmitter for sending out the different pulse sequences, and means operative at the central station to decode the pulse sequences and provide a record of the variable conditions.

References Cited in the file of this patent

UNITED STATES PATENTS

| | | |
|---|---|---|
| 2,207,743 | Larson et al. | July 15, 1940 |
| 2,239,094 | Harvey | Apr. 22, 1941 |
| 2,283,071 | Leathers | May 12, 1942 |
| 2,457,819 | Hoeppner | Jan. 4, 1949 |
| 2,468,703 | Hammel | Apr. 26, 1949 |
| 2,524,832 | Poylo | Oct. 10, 1950 |
| 2,525,893 | Gloess | Oct. 17, 1950 |
| 2,605,343 | McCreary | July 29, 1952 |
| 2,631,778 | Piper | Mar. 17, 1953 |